United States Patent [19]

Lindsay et al.

[11] 4,110,414
[45] Aug. 29, 1978

[54] THERMOPLASTIC POLYMER BLENDS OF ETHYLENE-PROPYLENE (EP) COPOLYMER WITH POLYETHYLENE

[75] Inventors: Geoffrey Andrew Lindsay, Hudson; Paul Thomas Stricharczuk, Solon, both of Ohio

[73] Assignee: The B. F. Goodrich Company, Akron, Ohio

[21] Appl. No.: 719,487

[22] Filed: Sep. 1, 1976

[51] Int. Cl.$^2$ ............................................. C08L 23/16
[52] U.S. Cl. ................................. 260/897 A; 260/848
[58] Field of Search ..................................... 260/897 A

[56] References Cited

U.S. PATENT DOCUMENTS 3,835,201  9/1974  Fischer ............................ 260/897 A

FOREIGN PATENT DOCUMENTS 798,416  11/1968  Canada ..................................... 260/897
927,881  11/1963  United Kingdom ..................... 260/897

Primary Examiner—Carman J. Seccuro
Attorney, Agent, or Firm—Alan A. Csontos

[57] ABSTRACT

Polymer blends of (1) high molecular weight ethylene-propylene (EP) copolymers having a high methylene run index with (2) low density polyethylenes are prepared by physically mixing the polymer components under conditions of heat and shear. The resultant blends are thermoplastic in nature and readily moldable and remoldable. The blends exhibit exceptionally high tensile strength without the use of curing or crosslinking agents. Products made from the polymer blends include liners and molded products such as tubing, toys, and household and automotive items.

6 Claims, No Drawings

THERMOPLASTIC POLYMER BLENDS OF ETHYLENE-PROPYLENE (EP) COPOLYMER WITH POLYETHYLENE

BACKGROUND OF THE INVENTION

Polymer blends of ethylene-propylene (EP) polymers or of ethylene-propylene-diene (EPDM) polymers with poly-α-monoolefin polymers, particularly with polyethylene, are known to the art (see U.S. Pat. Nos. 3,176,052; 3,220,966; 3,303,150; 3,328,486; 3,358,053; 3,751,521; 3,835,201; 3,887,640; 3,914,342; and 3,919,358, and British Pat. No. 1,208,065 and Canadian Pat. No. 602,151). Such blends are useful to prepare a broad range of molded products such as tubing, toys, and household and automotive items. For many applications, the item must have high structural integrity and good tensile strength. Unfortunately, these polymer blends often exhibit low tensile strengths. To achieve higher tensile strengths, curing or crosslinking agents have been added to such polymer blends to effect chemical changes in the blend (see U.S. Pat. Nos. 3,228,883; 3,256,366; 3,758,643; 3,806,558; and 3,862,106). The polymer blends of the present invention are thermoplastic physical blends of specific EP copolymers and polyethylene (PE) polymers, which blends exhibit unexpectedly superior tensile strengths. No curing or crosslinking agents are used in the polymer blends.

SUMMARY OF THE INVENTION

Thermoplastic polymer blends comprising (1) an ethylene-propylene (EP) copolymer having a raw polymer Mooney Viscosity (ML-4 at 150° C.) of from about 30 to about 80, an ethylene content of from about 60 percent to about 78 percent by weight and a methylene run index; i.e., a measure of the ratio of methylene units in runs of seven or more to the sum of the runs of three methylene units plus the runs of two methylene units, of 20 or above, and preferably from about 22/1 to about 40/1 and (2) a polyethylene (PE) polymer having a density of 0.91 to 0.94 g./cc. are prepared by physically mixing the polymer components under heat and shear conditions. The thermoplastic blends exhibit excellent tensile strengths, often greater than that exhibited from either polymer alone. No curing or crosslinking agents are used to obtain the superior tensile strengths of the thermoplastic blend.

DETAILED DESCRIPTION OF THE INVENTION

The thermoplastic polymer blends of this invention comprise a physical mixture of two polymer components, i.e., an ethylene-propylene (EP) copolymer and a polyethylene polymer. The polymers are mixed in a range of from about 5 parts by weight to about 200 parts by weight of PE per 100 parts by weight of EP polymer. The use of over 200 parts of PE per 100 parts of EP in the polymer blend is not necessary to achieve the advantages of the present invention. Excellent results are obtained when the polyethylene polymer is admixed in a range of from about 10 parts to about 100 parts of PE per 100 parts of EP copolymer.

The polymer blends are truly thermoplastic, exhibiting excellent strength and structural stability at ambient temperature but easily processable at temperatures about 120° C. A smooth roll is formed in milling operations, and the blends are readily extrudable and moldable, having good flow properties. Formed items made from the blends are reprocessable. In contrast to the thermoplastic blends disclosed in U.S. Pat. Nos. 3,228,883; 3,256,366; 3,785,643; 3,862,106 and 3,806,558, the polymer blends of the present invention do not use curing or crosslinking agents to effect partical cure of the polymer components. However, also in contrast to other polymer blends employing an EP copolymer, the EP copolymers used in the present invention are unique in having a high methylene run index, i.e., a high proportion of methylene units in runs of seven or more to the sum of the methylene units in runs of three plus the methylene units in runs of two, which index is a measurable property of the polymer. Other properties of the unique polymer used are disclosed in the following discussion.

The copolymer employed in the blends consists essentially of interpolymerized units of about 60 percent to about 78 percent by weight of ethylene and about 22 percent to about 40 percent by weight of propylene. More preferably, the copolymer consists essentially of from about 65 percent to about 75 percent by weight of ethylene and about 25 percent to about 35 percent by weight of propylene. The EP copolymers are prepared using polymerization techniques known to the art such as described in U.S. Pat. Nos. 2,954,367; 3,392,159; 3,801,558 and 3,821,186, and disclosed in an article by Duck et al., European Poly. J., Vol. 10 (1974) at pg. 77 et seq.

The ethylene-propylene copolymers employed have an unstretched crystallinity ranging from about 1 percent to about 20 percent based upon the polymer. More preferably, the EP copolymer has an unstretched crystallinity of from about 8 percent to about 15 percent of the EP polymer. The unstretched crystallinity of the EP polymer is measured using an X-ray technique. Measuring percent crystallinity in polymers via X-ray diffraction is a known technique (see Natta et al., Atti Accad-Nazi. Lincei, Rend. (8) 8 11 (1957)). The method used herein consisted of pressing a 0.020 inch thick film of the EP polymer at 120° C. and 20,000 pounds pressure. The films were quickly cooled (quenched) and then annealed at room temperature for at least 24 hours. The thin films are then mounted and exposed to X-rays, and a diffraction scan is made across an angular range. Using a diffractometer, a plot of the angular distribution of the radiation scattered by the film is made. This plot is seen as a diffraction pattern of sharp crystalline peaks superimposed upon an amorphous peak. The quantitative value of percent crystallinity is obtained by dividing the crystalline diffraction area of the plot by the total diffraction area on the plot.

A unique property of the EP copolymers employed in the blends with the polyethylene polymer is its high methylene run index (MRI). This index is a measurable value and is proportional to the ratio of methylene units in the polymer in runs of seven or more units to the sum total of the runs of methylene units in runs of three plus the methylene units in runs of two. The MRI is determined using Carbon-13 Nuclear Magnetic Resonance (NMR) spectroscopy and employing recently developed techniques to determine monomer sequencing. These techniques are described and published in the Journal of Polymer Science:Symposium No. 43 (1973), pages 237 to 250 and by C. Carman et al. in Rubber Chemistry and Technology, Vol. 44, No. 3 (1971), pages 781 to 804, and Macromolecules, Vol. 7 (1974), pages 789 to 793. The Carbon-13 spectrum for each EP copolymer sample was obtained using standard Fourier transform pulsed NMR techniques employing the following parameters: sweep width of 6000 HZ-, 16 K data points, 90° pulse angle of less than 16 μ sec. pulse width, 5 second repetition rate, and at least 1000 transients and a line broadening of 1.5 Hz. The instrument used was a Bruker pulsed Fourier transform NMR Model HX90E operating at 22.63 MHz. The EP copolymers were prepared as 10 percent or 20 percent weight per volume solutions in trichlorobenzene and the spectra obtained at 110° C. or above.

The methylene run index is determined by the formula $$MRI = \frac{\delta+\delta+}{\beta\beta + \alpha\beta(5)}$$

wherein $\delta+\delta+$ is the methylene units in runs of 7 or more, $\beta\beta$ is the methylene units in runs of 3, and $\alpha\beta$ is the methylene units in runs of 2. The values for the Index are obtained by measuring the peak intensity of the Carbon-13 resonance (relative to an internal reference of hexamethyl disiloxane) at 28.0 ppm, the $\delta+\delta+$ value, and the peak intensities of the polymer at 23.0 ppm, the $\beta\beta$ value, and at 32.9 ppm, the $\alpha\beta$ value, all peaks as evidenced in the NMR spectra. The EP copolymers used in the polymer blends of the invention have a methylene run index (MRI) of at least about 20/1, and more preferably from about 22/1 to about 40/1.

The EP copolymers are high molecular weight elastomers. They have a Mooney Viscosity (ML-4 at 150° C.) of from about 30 to about 80 and preferably from about 40 to 70. The EP copolymers also have a dilute solution viscosity (DSV) of about 1.5 to about 4.5 measured at 135° C. as a solution of 0.1 gram of polymer per diciliter of decahydronaphthalene. The raw polymer has a tensile strength of about 500 psi minimum and more typically from about 600 psi to about 1800 psi, and an elongation at break of at least about 600 percent.

The polyethylene employed in the blend is a low density polyethylene from about 0.91 to 0.94 gram/cc. The low density polyethylenes provide actual tensile reinforcement between the polymers. The polyethylenes have a melt index of from about 0.1 gram/10 minutes to about 20 grams/10 minutes measured at 190° C. under a 2.16 kilogram load. The melt index of the polyethylene is preferably below 7 grams/10 minutes. The polyethylenes are commercially available, and can be readily prepared using standard polymerization techniques known to the art. As mentioned before, the polyethylene is used at from about 5 parts to about 200 parts by weight with 100 parts by weight of the EP copolymer. Particularly good results are obtained when the PE is used at about 10 parts to about 100 parts by weight with 100 parts by weight of EP copolymer.

The composition of the invention comprises a physical blend of the EP copolymer and polyethylene (PE) polymer. No cure or crosslinking agents are employed. It was totally unexpected that the thermoplastic polymer blend of the two polymeric components would exhibit a tensile strength substantially greater than that predicted from the additive individual effects of any one component alone. Prior to this invention, the classic behavior of uncured polymer blends is that tensile strengths of the blend would be lower than the additive individual effects of each polymer.

Tensile strengths of the blends were determined following ASTM procedure D412 (using a pull rate of 20 inches/minute). Predicted tensile strengths of the blends are calculated by assuming a purely additive relationship between the tensile strengths of the EP copolymer and PE polymer used. The predicted tensile strength is the tensile strength indicated on a straight line drawn between the tensile strengths of the EP copolymer and the PE polymer on a plot with tensile strength as the ordinate and the weight percent of PE in the blend as the abscissa. For example, if the EP copolymer has a tensile strength of 990 psi and the PE has a tensile strength of 1880 psi, on a plot of tensile strength versus weight percent of PE in the polymer blend from 0 percent to 100 percent, a straight line is drawn from 990 to 1880. At the point on the abscissa indicating the weight percent of PE in the blend, a perpendicular line is drawn to intersect the straight line on the plot. The point of intersection indicates the predicted tensile strength of the particular polymer blend. An actual measured tensile strength which is greater than the predicted tensile strength shows synergistic behavior. For purposes of this application, the difference in psi between the actual measured tensile strength and the predicted tensile strength is called Δ Tensile. The thermoplastic polymer blends of the invention exhibit Δ Tensile of at least about 200 psi.

The polymer blends are truly thermoplastic, i.e., moldable and remoldable at temperatures of about 120° C., preferably at temperatures above 160° C. to about 200° C. and yet having a strong, flexible plastic nature at room temperatures.

A wide range of rubber and plastic compounding ingredients are readily mixed with the thermoplastic polymer blends using mixing equipment such as two-roll mills, extruders, banbury mixers, and the like. Standard mixing and addition techniques are used. Examples of compounding ingredients which can be used are metal oxides like zinc, calcium, and magnesium oxide, lead monoxide and dioxide, fatty acids such as stearic and lauric acid, and salts thereof such as cadmium, zinc and copper stearate and lead oleate; fillers such as the carbon blacks like channel blacks, high reinforcing blacks as N110 and N330, low reinforcing blacks as N550 and N770, and thermal blacks as N880 and N990, calcium and magnesium carbonates, calcium and barium sulfates, aluminum silicates, phenol-formaldehyde and polystyrene resins, asbestos, and the like; plasticizers and extenders such as dialkyl and diaryl organic acids like diisobutyl, diisooctyl, diisodecyl, and dibenzyloleates, stearates, sebacates, azelates, phthalates, and the like; ASTM type 2 petroleum oils, ASTM D2226 aromatic, naphthalenic and paraffinic oils, castor oil, tall oil, glycerin, and the like; antioxidants, antiozonants, and stabilizers such as di-$\beta$-naphthyl-p-phenylenediamine, phenyl-$\beta$-naphthylamine, dioctyl-p-phenylenediamine, N-1,3-dimethylbutyl-N-phenyl-p-phenylenediamine, 4-isopropylamino diphenylamine, 2,6-di-t-butyl paracresol, 2,2'-methylenebis(4-ethyl-6-t-butyl phenol), 2,2'-thiobis-(4-methyl-6-t-butyl phenol), bisphenol-2,2'-methylenebis-6-t-butyl-4-ethylphenol, 4,4'-butylidenebis-(6-t-butyl-m-cresol), 2-(4-hydroxy-3,5-t-butylaniline)-4,6-bis (octylthio)-1,3,5-triazine, hexahydro-1,3,5-tris-$\beta$-(3,5-di-t-butyl-4-hydroxyphenyl)-propionyl-s-triazine, tris-(3,5-di-t-butyl-4-hydroxybenzyl)isocyanurate, tetrakismethylene-3-(3',5'-di-t-butyl-4'-hydroxyphenyl) propionate methane, distearyl thiodipropionate, dilauryl thiodipropionate, tri(nonylated-phenyl)phosphite, and the like; and other ingredients such as pigments, tackifiers, flame retardants, fungicides, and the like. Such ingredients can be used in levels well known to those skilled in the art.

Applications for the thermoplastic polymer blends include tubing, liners, wire and cable insulation, mats, and molded items such as shoe soles, toys, kitchen ware, and the like.

The blends were evaluated for their stress-strain properties, i.e., tensile, modulus, and elongation, following ASTM procedure D412 (using a pull rate of 20 inches/minute).

The following examples are presented to further illustrate the invention. Unless otherwise stated, the ingredients recited in the recipes are used in parts by weight.

EXAMPLES

The polymeric components of the blends, along with compounding ingredients, if used, were mixed together using either a two-roll mill or a banbury mixer. In the mill mix procedure, the roll ratio was 1.2 to 1 and the front roll had a roll speed of about 21 rpm. Roll temperature was about 140° C. The EPDM was banded on the mill and the polyethylene and compounding ingredients (if used) added to the banded polymer. Total mill time was about 5 minutes.

In the banbury mix procedure, the polymeric components of the blends, along with compounding ingredients, if used, were mixed together using a banbury mixer at a temperature of about 300° F. (150° C.). The EP was added to the banbury mixer and the other polymeric and compounding ingredients (if used) then added to the polymer blend. Total mixing time was about 5 minutes. The composition was removed from the banbury and then sheeted on a two roll mill at a temperature of about 100° C.

The mixing conditions and temperatures outlined above were used to get uniform dispersion of the polymers and ingredients in the thermoplastic blend. This can be accomplished using other mixing equipment, by mixing at other temperatures and for other times, and the like; all of which conditions and procedures are known to the artisan. The above conditions were used to achieve good, thorough mixing, and are outlined to illustrate the preparation of the physical blends of the examples.

EXAMPLE I

EP copolymers of the invention were mixed with either (a) a PE polymer sold by Eastman Chemical as Epolene C-14 or (b) a PE polymer sold by USI as NA-301, and the resulting thermoplastic blends evaluated for their tensile strength and elongation. For comparative purposes, other EP polymers having properties outside of the scope of the definition for the copolymers of the invention were also mixed with the same PE polymers and the blends evaluated. The Epolene C-14 PE polymer used to prepare the blends has a density of about 0.918 g./cc., a melt flow rate of about 1.6 grams/10 minutes at 230° C., and a tensile strength of about 1900 psi and an elongation of about 600 percent. The USI NA-301 PE polymer used has a density of about 0.92 g./cc., a melt flow rate of about 1.3 grams/10 minutes at 190° C., and a tensile strength of about 1900 psi and an elongation of about 650 percent. The EP polymers employed are identified as follows:

| | Tensile Strength (psi) | Elongation (%) | Weight Percent Monomers | | Methylene Run Index | Mooney Viscosity ML-4 at 150° C. | Percent Crystalinity |
|---|---|---|---|---|---|---|---|
| | | | Ethylene | Propylene | | | |
| EP-1 | 660 | 770 | 72 | 28 | 39 | 48 | 12 |
| EP-2 | 1720 | 690 | 72 | 28 | 26 | 81 | 12 |
| EP-3 | 1420 | 710 | 69 | 31 | 21 | 61 | 9 |
| EP-4 | 1230 | 740 | 68 | 32 | 29 | 55 | 10 |
| EP-5 | 1180 | 690 | 68 | 32 | 6 | 68 | — |
| EP-6 | 800 | 1150 | 72 | 28 | 12 | — | — |
| EP-7 | 750 | 770 | 76 | 24 | 8 | 80 | 15 |
| EP-8 | 220 | 200 | 65 | 35 | 6 | 33 | 6 |
| EP-9 | 25 | 500 | 50 | 50 | 1 | 50 | 0 |

The EP copolymers and PE polymer were blended together using a banbury mixer or a two-roll mill operating at a temperature of about 300° F. (150° C.). The samples for tensile and elongation measurements were compression molded at 360° F. (182° C.). The recipes used and data obtained are as follows:

| | 1 | 2 | 3 | 4 | 5 | 6 | 7 | 8 | 9 |
|---|---|---|---|---|---|---|---|---|---|
| EP-1 | 100 | — | — | — | — | — | — | — | — |
| EP-2 | — | 100 | — | — | — | — | — | — | — |
| EP-3 | — | — | 100 | — | — | — | — | — | — |
| EP-4 | — | — | — | 100 | — | — | — | — | — |
| EP-5 | — | — | — | — | 100 | — | — | — | — |
| EP-6 | — | — | — | — | — | 100 | — | — | — |
| EP-7 | — | — | — | — | — | — | 100 | — | — |
| EP-8 | — | — | — | — | — | — | — | 100 | — |
| EP-9 | — | — | — | — | — | — | — | — | 100 |
| Epolene C-14 | 50 | 50 | 50 | 50 | 50 | — | 25 | — | 25 |
| USI NA-301 | — | — | — | — | — | 50 | — | 50 | — |
| Tensile Strength, psi | 1460 | 2460 | 2340 | 2030 | 1220 | 1220 | 1040 | 610 | 80 |
| Predicted Tensile Strength, psi | 1070 | 1780 | 1580 | 1450 | 1420 | 1170 | 980 | 780 | 400 |
| Δ Tensile | 390 | 680 | 760 | 580 | (−200) | 50 | 60 | (−170) | (−320) |
| Elongation, percent | 880 | 740 | 790 | 810 | 830 | 910 | 750 | 730 | 580 |
| Hardness, Durometer A | 83 | 88 | 82 | 87 | 86 | — | 80 | — | 60 |

Samples 1 to 4, thermoplastic polymer blends of the present invention, have excellent tensile strength. The measured tensile strength is unexpectedly superior to those of the other blends, and is at least 200 psi greater than that predicted from the additive value.

EXAMPLE II

An EP copolymer of the invention was blended with PE polymer at various levels of PE polymer to EP copolymer. The polymers were mixed for 4 minutes using a two-roll mill operating at 300° F. (150° C.). The resulting thermoplastic blends exhibited excellent tensile strengths. The data shows that, generally, the use of over 100 parts by weight of PE polymer per 100 parts of EP copolymer is not necessary to achieve the optimum tensile properties of the blends.

|  | 1 | 2 | 3 | 4 | 5 | 6 | 7 | 8 |
|---|---|---|---|---|---|---|---|---|
| EP[a] | 100 | 100 | 100 | — | — | — | — | — |
| EP[b] | — | — | — | 100 | 100 | 100 | 100 | 100 |
| Parts of PE per 100 EP | 10 | 25 | 50 | 5 | 25 | 50 | 100 | 150 |
| Tensile Strength, psi | 1240 | 1410 | 1460 | 1540 | 1700 | 2030 | 1940 | 1930 |
| Predicted Tensile, psi | 770 | 910 | 1070 | 1260 | 1360 | 1450 | 1570 | 1630 |
| Δ Tensile, psi | 470 | 500 | 390 | 280 | 340 | 580 | 370 | 300 |
| Elongation, percent | 870 | 910 | 880 | 750 | 770 | 810 | 730 | 750 |

[a]EP copolymer of 72% ethylene/28% propylene having a tensile strength of 660 psi and an elongation of 770 percent, and methylene run index of 39.
[b]EP copolymer of 68% ethylene/32% propylene having a tensile strength of 1230 psi, an elongation of 740%, and a methylene run index of 29.
[c]Polyethylene having a density of about 0.92 g./cc., a melt flow rate of 1.6 g./10 minutes at 190° C., a 1900 psi tensile, and a 600 percent elongation, sold as Epolene C-14.

We claim:

1. A thermoplastic polymer blend comprising (1) an EP copolymer consisting essentially of interpolymerized units of about 65 to about 75 percent by weight of ethylene and about 25 percent to about 35 percent by weight of propylene, said polymer having a Mooney Viscosity (ML-4 at 150° C.) of from about 30 to about 80 and a methylene run index of over about 20/1 and (2) from about 5 parts to about 200 parts by weight per 100 parts by weight of the EP copolymer of a polyethylene polymer having a density of about 0.91 to 0.94 grams/cc.

2. A thermoplastic polymer blend of claim 1 wherein the polyethylene polymer is present in from about 10 parts to about 100 parts by weight per 100 parts by weight of the EP copolymer.

3. A thermoplastic polymer blend of claim 2 wherein the EP polymer has a methylene run index of from about 22/1 to about 40/1.

4. A thermoplastic polymer blend of claim 3 wherein the EP copolymer has a Mooney Viscosity of from about 40 to about 70.

5. A thermoplastic polymer blend of claim 4 comprising (1) an EP copolymer consisting essentially of interpolymerized units of about 72 percent by weight of ethylene and about 28 percent by weight of propylene, and having a methylene run index of about 39, and (2) from about 10 parts to about 100 parts by weight per 100 parts by weight of the EP copolymer, of a polyethylene polymer having a density of about 0.92 gram/cc.

6. A thermoplastic polymer blend of claim 4 comprising (1) an EP copolymer consisting essentially of interpolymerized units of about 68 percent by weight of ethylene and about 32 percent by weight of propylene, and having a methylene run index of about 29, and (2) from about 10 parts to about 100 parts by weight per 100 parts by weight of the EP copolymer, of a polyethylene polymer having a density of about 0.92 gram/cc.

* * * * *